UNITED STATES PATENT OFFICE.

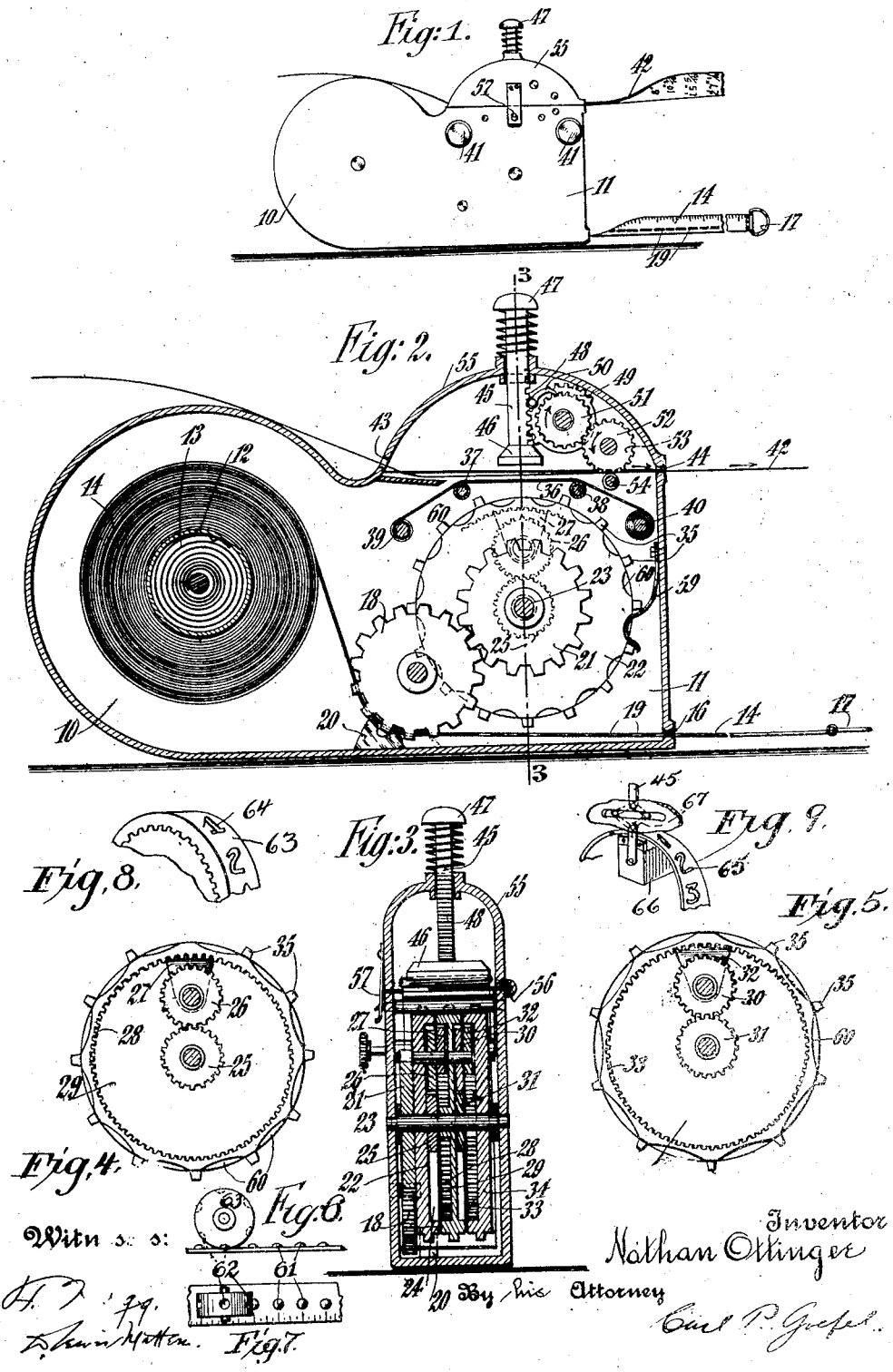

NATHAN OTTINGER, OF NEW YORK, N. Y.

MEASURING DEVICE.

1,237,808.  Specification of Letters Patent.  Patented Aug. 21, 1917.

Application filed May 8, 1915. Serial No. 26,707.

*To all whom it may concern:*

Be it known that I, NATHAN OTTINGER, a citizen of the United States of America, and a resident of New York city, in the county of New York and State of New York, have invented certain new and useful Improvements in Measuring Devices, of which the following is a specification.

This invention relates to improvements in and relating to measuring devices, and has for its object to provide a device of this character by which a succession of measurements may be recorded by the person measuring without necessitating the use of a helper or stopping the measuring to put down the measurement made. Another object of my invention is to provide such a device which will be neat in appearance, simple and inexpensive in construction, and accurate in operation. While such a device may be used for any kind of measurements, it is particularly adapted to the uses of a tailor who usually makes a succession of measurements in a regular order and either stops to put down the measurements or has a helper take them down.

With these and other objects in view, my invention comprises the novel features, arrangement and construction of parts hereinafter more fully described with reference to the accompanying drawings and particularly pointed out in the claims.

In the drawings,

Figure 1 is a side elevation of my improved device;

Fig. 2 is a sectional view thereof;

Fig. 3 is a cross-sectional view thereof on the line 3—3 of Fig. 2;

Fig. 4 is a detail view of one of the printing disks;

Fig. 5 is a detail view of another of the printing disks;

Fig. 6 is a side view of a modified form of tape measure; Fig. 7 is a plan view thereof; Figs. 8 and 9 are fragmentary perspective views of modified forms of type.

Similar reference characters indicate corresponding parts throughout the several views.

Referring to the drawings, and more particularly to Fig. 2 thereof, a casing comprising two compartments 10 and 11 is provided. In the compartment 10 is a cylindrical shaft 12 having a spring 13 therein and having wound thereon a tape measure 14, which is controlled by the said spring in the usual manner. The said tape passes through the compartment 11 and out of a slot 16 therein, and is provided on its end with a ring 17, for facilitating pulling of the tape, and also for preventing the end from going into the casing. Intermediate the outlet end of the casing and the shaft 12, the tape measure 14 engages a toothed wheel 18 by means of apertures 19 provided along the sides of the said tape, and is held in position on the said wheel 18 by means of a guide member 20. The said gear wheel meshes with and actuates a gear wheel 21 carried by a disk 22 mounted on a shaft 23, which disk is divided into sixteen spaces, representative of fractions of an inch. The said gears are so proportioned that the disk 22 will rotate once for every inch the tape measure is pulled out or in the casing. The inner side of the said disk is recessed as at 29, and a stationary toothed wheel 25 is mounted on the said shaft 23 adjacent the said disk. A pinion 26 is carried by the said disk and intermeshes with the stationary gear wheel, so that the pinion is rotated once during every revolution of the said disk. A segment 27 is provided on the pinion 26, which is adapted to engage the interiorly toothed rim 28 of a second disk 29', which is divided into twelve spaces, to represent inches in a foot, for a sufficent time during the revolution of the pinion 26 to turn the disk 29 through one space. In a similar manner to that of the disk 22 the disk 29 is provided on its opposite side with a pinion 30, which meshes with a stationary toothed wheel 31 provided on the shaft, and which is provided with a segment 32 which meshes during a portion of the revolution of the pinion with the interiorly toothed rim 33 of a disk 34, which disk is divided into ten spaces, to represent feet, to turn the same through one space. The number of spaces of this last disk may be varied as desired, according to the capacity of the tape.

Each of the said disks 22, 29 and 34 are provided with steel type 35, on the disk 22 representing the fractions from $\frac{1}{16}$ to $\frac{15}{16}$ inches inclusive, the last space being left blank; on the disk 29 representing from 1 to 11 inches inclusive, the last space being left blank and on the disk 34 representing from 1 foot to 10 feet, or as many feet as the capacity of the tape will permit, one space being left blank.

It will be seen that when the tape is entirely within the casing all of the blank spaces will be in alinement at the upper side of the disks, and as the tape is pulled out the numbers at the top will increase, and as the same is carried back into the casing the numbers will decrease until the blank spaces appear again when the tape is completely within the casing. Springs 59 are provided, which engage recesses 60 on the peripheries of the disks 22, 29 and 34 respectively, so that the type is always in the proper printing alinement.

An inked ribbon 36 or other similar printing median is mounted on rollers 37, 38 above the upper disks 22, 29 and 34, and has its ends wound on spools 39, 40, having the manipulating handles 41 for moving the said ribbon across the type of the disks when desired to renew the inking surface.

While I have illustrated a manual method of moving this ribbon, it is obvious that automatic means may be employed if desired. The strip of paper 42 on which the measurements are printed is fed through slots 43 and 44 over the printing ribbon and out of the casing where it may be torn off or removed after the measurements are printed thereon. The printing operation is accomplished by means of a spring-controlled plunger 45 having a flat base 46 and a head 47, which by pressure on the said head forces the paper and the ribbon into contact with the steel type, thereby causing the impression to appear on the paper by means of the ribbon. For feeding the paper out of the casing as each succeeding measurement is recorded, the plunger 45 is provided with teeth 48 which mesh with a gear wheel 49, so that during upward and downward movement of the said plunger the gear wheel is rotated. A pawl 50 is provided on the gear wheel 49, which engages a ratchet 51 provided on the same shaft with the gear 50, the said pawls riding over the ratchet during the downward movement of the plunger and rotating the same during upward movement. A gear 52 provided on the end of a feed roller 53, between which and a guide roller 54 the paper passes, intermeshes with the said gear 51, so that the paper is fed forward every time the plunger is actuated. The upper portion 55 of the casing, housing the plunger and the roller, is preferably hinged to the compartment 11, as at 56, and is provided with a snap-catch 57, so that the strip of paper may be readily placed therein.

If desired, the paper 42 may be in the form of a roll, another compartment being provided at the side of the tape measure for containing the same, the paper being torn off after the measurements are recorded, or it may be in the form of cards, or other suitable forms may be employed as desired.

With my invention a very compact and convenient measuring device is provided, which may be carried in the hand of the tailor as the measurements are made, and by merely pressing the plunger with his thumb, the measurements will be recorded correctly and neatly and without necessitating a stop in the measurements, or the use of a helper.

While I have mentioned the use of my invention by a tailor, it will be equally useful to surveyors, architects, builders, and for numerous other uses which will be obvious from this disclosure.

If desired, instead of the perforated tape, the tape may be provided with bosses or projections 61 engaging recesses 62 provided in the periphery of a wheel 63 for rotating the disks, as clearly shown in Figs. 6 and 7. Also the means for imparting the measurements to a piece of paper may be varied, for instance as shown in Fig. 8, in which the type 64 are knife-edged and adapted to cut an impression upon the paper. In the form shown in Fig. 9 the periphery of the disk is perforated as at 65 with the measurements, and these are stenciled upon the paper by means of a stenciling device 66 adapted to be raised into engagement with the disk by means of levers 67 operated by the plunger 45.

In connection with the use of the stencil tape a very simple form of device can be obtained by combining with the stencil tape a form of well-known stamping pad or plunger or other stamping device.

Other modifications may be resorted to within the spirit and scope of the invention, so that I do not, therefore, wish to be limited to the preferred and satisfactory form described and illustrated, except as may be required by the claims.

I claim:—

1. In a measuring device, the combination of a tape measure for measuring extraneous surfaces, recording means adapted to receive a record receiving means, said recording means comprising impression producing means respectively distinctively identifying the graduations on said tape measure, said last named means adapted to be operated relatively to the movement of said tape measure to bring said respective impression producing means into relation with said record receiving means to produce impressions on said record receiving means, recording the measurement made by said tape measure of said extraneous surfaces.

2. In a measuring device, the combination of a casing, an extensible measuring tape held within said casing, recording means carried by said casing adapted to engage said measuring tape and adapted to receive a record receiving means, said recording means comprising impression producing means respectively distinctively identifying the graduations on said tape measure, said last named means adapted to be operated relatively to the movement of said tape measure from said casing to bring said respective impression producing means into relation with said record receiving means to produce impressions on said record receiving means, recording the record made by said tape measure of said extraneous surfaces.

3. In a measuring device, the combination of a tape measure for measuring extraneous surfaces, recording means adapted to receive a record receiving means, said recording means comprising impression producing means respectively distinctively identifying the graduations on said tape measure, said last named means adapted to be operated relatively to the movement of said tape measure to bring said respective impression producing means into relation with said record receiving means to successively produce thereon in uniformly spaced relation impressions recording the successive arbitrary measurements made by said tape measure of said extraneous surfaces.

4. In a measuring device, the combination of an elongated measure having graduations thereon for measuring extraneous surfaces, recording means adapted to be brought into coöperative relation with a record receiving means, said recording means comprising impression producing means respectively distinctively identifying the graduations on said measure, said last named means adapted to be operated relatively to the movement of said measure to bring said respective impression producing means into relation with said record receiving means to produce impressions on said record receiving means, recording the measurements made by said measure of said extraneous surfaces.

In testimony, that I claim the foregoing as my invention, I have signed my name in presence of two subscribing witnesses.

NATHAN OTTINGER.

Witnesses:
ROSALIE NYKERK,
HAROLD C. MITCHELL.